(12) United States Patent
Taguchi

(10) Patent No.: US 8,738,738 B2
(45) Date of Patent: May 27, 2014

(54) FILE TRANSMITTING APPARATUS, FILE TRANSMITTING METHOD, AND FILE TRANSMITTING PROGRAM

(75) Inventor: Kentaro Taguchi, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 244 days.

(21) Appl. No.: 13/186,551

(22) Filed: Jul. 20, 2011

(65) Prior Publication Data

US 2012/0110133 A1 May 3, 2012

(30) Foreign Application Priority Data

Oct. 27, 2010 (JP) ................................. 2010-241268

(51) Int. Cl.
*G06F 15/16* (2006.01)

(52) U.S. Cl.
USPC ............ 709/219; 709/203; 709/218; 709/223

(58) Field of Classification Search
USPC ................. 709/202–203, 217–219, 223–224, 709/245–246
See application file for complete search history.

(56) References Cited

U.S. PATENT DOCUMENTS

| | | | |
|---|---|---|---|
| 6,883,142 B2 * | 4/2005 | Shimamoto et al. | 709/217 |
| 7,484,103 B2 * | 1/2009 | Woo et al. | 709/223 |
| 7,535,477 B2 * | 5/2009 | Zaima et al. | 709/246 |
| 7,633,640 B2 * | 12/2009 | Miura et al. | 709/203 |
| 2005/0021647 A1 | 1/2005 | Maeda | |
| 2005/0141019 A1 * | 6/2005 | Ohmori | 709/203 |
| 2009/0300360 A1 * | 12/2009 | Sakaguchi et al. | 709/223 |
| 2010/0229109 A1 | 9/2010 | Miwa | |

FOREIGN PATENT DOCUMENTS

| | | |
|---|---|---|
| JP | 11-065963 | 3/1999 |
| JP | 2001-197248 | 7/2001 |
| JP | 2003-208382 | 7/2003 |
| JP | 2010-049358 | 3/2010 |
| JP | 2010-206452 | 9/2010 |

OTHER PUBLICATIONS

Japanese Office Action dated Nov. 19, 2013; Application No. JP2010-241268; 3 pages and English translation of Japanese Office Action; 3 pages.

* cited by examiner

*Primary Examiner* — Bharat N Barot
(74) *Attorney, Agent, or Firm* — Antonelli, Terry, Stout & Kraus, LLP.

(57) ABSTRACT

A file transmitting apparatus carries out accepting client information of a client as a transmission target from a transmitting terminal 300 used by a client who is to transmit a file, identifying the client-specific application use authority information of the client as the transmission target in the storing device using the client information as accepted as a key, and storing the client-specific application use authority information as identified, accepting the file to be transmitted from the transmitting terminal 300, and transmitting information of the file to be transmitted with the client-specific application use authority information concerning the client as a transmission target stored in the storing device to an address of the terminal as a transmission target, and transmitting the file to be transmitted to a terminal address of the client as a transmission target according to an instruction from the transmitting terminal 300.

10 Claims, 20 Drawing Sheets

CLIENT INFORMATION 501

| CLIENT CODE | CLIENT NAME |
|---|---|
| CLIENT A | CLIENT NAME A |
| CLIENT B | CLIENT NAME B |
| ... | ... |
|  |  |

FIG. 4

CLIENT-SPECIFIC APPLICATION USE AUTHORITY INFORMATION 502

| CLIENT CODE | APPLICATION NAME | FILE FORMAT |
|---|---|---|
| CLIENT A | APPLICATION X | DOC |
| CLIENT B | APPLICATION Y | RTF |
| ... | ... | |
| | | |

FIG. 5

CUSTOMER SELECTION INFORMATION 131

| CLIENT CODE | CLIENT NAME |
|---|---|
| CLIENT B | CLIENT NAME B |

FIG. 7

CUSTOMER APPLICATION USE AUTHORITY INFORMATION 132

| CLIENT CODE | APPLICATION NAME | FILE FORMAT |
|---|---|---|
| CLIENT B | APPLICATION X | RTF |

FIG. 8

| CLIENT-SPECIFIC EXTERNAL APPLICATION USE AUTHORITY INFORMATION 910 | | |
| --- | --- | --- |
| CLIENT CODE | APPLICATION NAME | FILE FORMAT |
| CLIENT A | APPLICATION X | DOC |
| CLIENT B | APPLICATION Y | RTF |
| ... | ... | |
| | | |

FIG. 20

FILE TRANSMITTING APPARATUS, FILE TRANSMITTING METHOD, AND FILE TRANSMITTING PROGRAM

CROSS-REFERENCE TO RELATED APPLICATION(S)

The present application claims priority upon Japanese Patent Application No. 2010-241268 filed on Oct. 27, 2010, which is herein incorporated by reference.

BACKGROUND

1. Field of the Invention

The present invention relates to a file transmitting apparatus, a file transmitting method, and a file transmitting program, and more particularly to a technique of presenting to a file transmitting party information of a file format which is able to be operated and/or edited by a file receiving party and supporting file transmission according to the corresponding file format.

2. Related Art

As globalization of enterprises progresses, exchanges of non-structural data through networks increase, regardless of those performed domestically/internationally, intra-company/inter-company, the non-structural data including design information such as 3D-CAD drawings, specifications, and the like. However, since these non-structural data are generated by a variety of applications, the data cannot be opened by the file receiving party, if the application compatible with the data is not available to the file receiving party. In this case, the file transmitting party is required to resend the data in a file format available to the file receiving party.

In the related art concerning the above circumstances, a data format conversion method among companies using an EDI in which intra-company format data transmitted from an EDI user company as a transmitter that is unique to the EDI user company as a transmitter can be received by an EDI user company as a receiver as intra-company format data unique to the EDI user company as a receiver, for example. Data conversion profile information is preliminarily registered at a specific site on the Internet for converting the intra-company format data of the EDI user company into EDI standard format data and converting the EDI standard format data into the intra-company format data of the EDI user company. The intra-company format data unique to the EDI user company as a transmitter is converted physically and logically into the EDI standard format data based on the data conversion profile information for the EDI user company as a transmitter at the specific site. Then, the EDI standard format data is converted physically and logically based on the data conversion profile information for the EDI user company as a receiver into the intra-company format data of the EDI user company as a receiver, and transmitted to the EDI user company as a receiver. See Japanese Patent Application Laid-open Publication No. 2003-208382.

Meanwhile, it is proposed such a graphics communication system as the one implemented by an E-mail having an E-mail device of the transmitting side including an electronic mail sending means which transmits an E-mail, a graphics file attachment means to attach a graphics file to said E-mail, a reading means which reads a picture, and a mode designating means which specifies a mode in which a picture is read, an E-mail device of the receiving side including an E-mail receiving means which receives an E-mail, a file extraction means which takes out an attached file of an E-mail, a judging means which judges whether said attached file is a graphics file, and an image processing means which processes a graphics file, characterized by a function which adds information required for creation of a graphics file to a graphics file attached to an E-mail, and transmits an E-mail. See Japanese Patent Application Laid-open Publication No. Hei11 (1999)-65963.

According to the related art, file reception with a data format in compliance with that of a certain system, for example, an intra-company system becomes possible. However, it is difficult to handle the non-structural data since data must be stored in a general-purpose format. Further, according to the related art, though file transmission in response to the processing capacity of the transmission target becomes possible, the capacity of the receiving party must be known to the transmitting party, and this causes a problem in exchanging files with a variety of customers.

SUMMARY OF THE INVENTION

In order to solve the above and other problems, an object of the present invention is to provide a technique of presenting to a file transmitting party information of a file format which is able to be operated and/or edited by a file receiving party and supporting file transmission according to the corresponding file format.

One aspect of the present invention is a file transmitting apparatus as an information processing apparatus connected to a plurality of terminals of clients for transmitting and receiving a file through a network, the file transmitting apparatus comprising a communicating device for communicating with the terminals through the network, a storing device for storing, for each client, client information for identifying the client, client-specific application use authority information as information of an application available to the client, and a terminal address, and an operating device for carrying out accepting client information of a client as a transmission target from a transmitting terminal used by a client who is to transmit a file, identifying the client-specific application use authority information of the client as the transmission target in the storing device using the client information as accepted as a key, and storing the client-specific application use authority information as identified, accepting the file to be transmitted from the transmitting terminal, and transmitting information of the file to be transmitted with the client-specific application use authority information concerning the client as a transmission target stored in the storing device to an address of the terminal as a transmission target, and transmitting the file to be transmitted to the terminal address of the client as a transmission target according to an instruction from the transmitting terminal.

Another aspect of the present invention is a file transmitting method carried out in an information processing apparatus connected to a plurality of terminals of clients for transmitting and receiving a file through a network, the information processing apparatus including a communicating device for communicating with the terminals through the network, and a storing device for storing, for each client, client information for identifying the client, client-specific application use authority information as information of an application available to the client, and a terminal address, the file transmitting method comprising accepting client information of a client as a transmission target from a transmitting terminal used by a client who is to transmit a file, identifying the client-specific application use authority information of the client as the transmission target in the storing device using the client information as accepted as a key, and storing the client-specific application use authority information as identified, by the information processing apparatus, accepting the file to be transmitted from the transmitting terminal, and transmitting information of the file to be transmitted with the client-specific application use authority information concerning the client as a transmission target stored in the storing device to an address of the terminal as a transmission target, by the information processing apparatus, and transmitting the file to be transmitted to the terminal address of the client as a transmission target according to an instruction from the transmitting terminal, by the information processing apparatus.

Yet another aspect of the present invention is a file transmitting program causing an information processing apparatus connected to a plurality of terminals of clients for transmitting and receiving a file through a network, the information processing apparatus including a communicating device for communicating with the terminals through the network, and a storing device for storing, for each client, client information for identifying the client, client-specific application use authority information as information of an application available to the client, and a terminal address, to carry out accepting client information of a client as a transmission target from a transmitting terminal used by a client who is to transmit a file, identifying the client-specific application use authority information of the client as the transmission target in the storing device using the client information as accepted as a key, and storing the client-specific application use authority information as identified, accepting the file to be transmitted from the transmitting terminal, and transmitting information of the file to be transmitted with the client-specific application use authority information concerning the client as a transmission target stored in the storing device to an address of the terminal as a transmission target, and transmitting the file to be transmitted to the terminal address of the client as a transmission target according to an instruction from the transmitting terminal.

According to the present invention, it becomes possible to present to a file transmitting party information of a file format which is able to be operated and/or edited by a file receiving party and to support file transmission according to the corresponding file format.

BRIEF DESCRIPTION OF THE DRAWINGS

FIG. 4 shows an example of a configuration of client information;

FIG. 5 shows an example of a configuration of client-specific application use authority information;

FIG. 7 shows an example of a configuration of customer selection information;

FIG. 8 shows an example of a configuration of customer application use authority information;

FIG. 20 shows an example of a configuration of client-specific external application use authority information.

DESCRIPTION OF THE EMBODIMENT

First Embodiment

Figure 1:
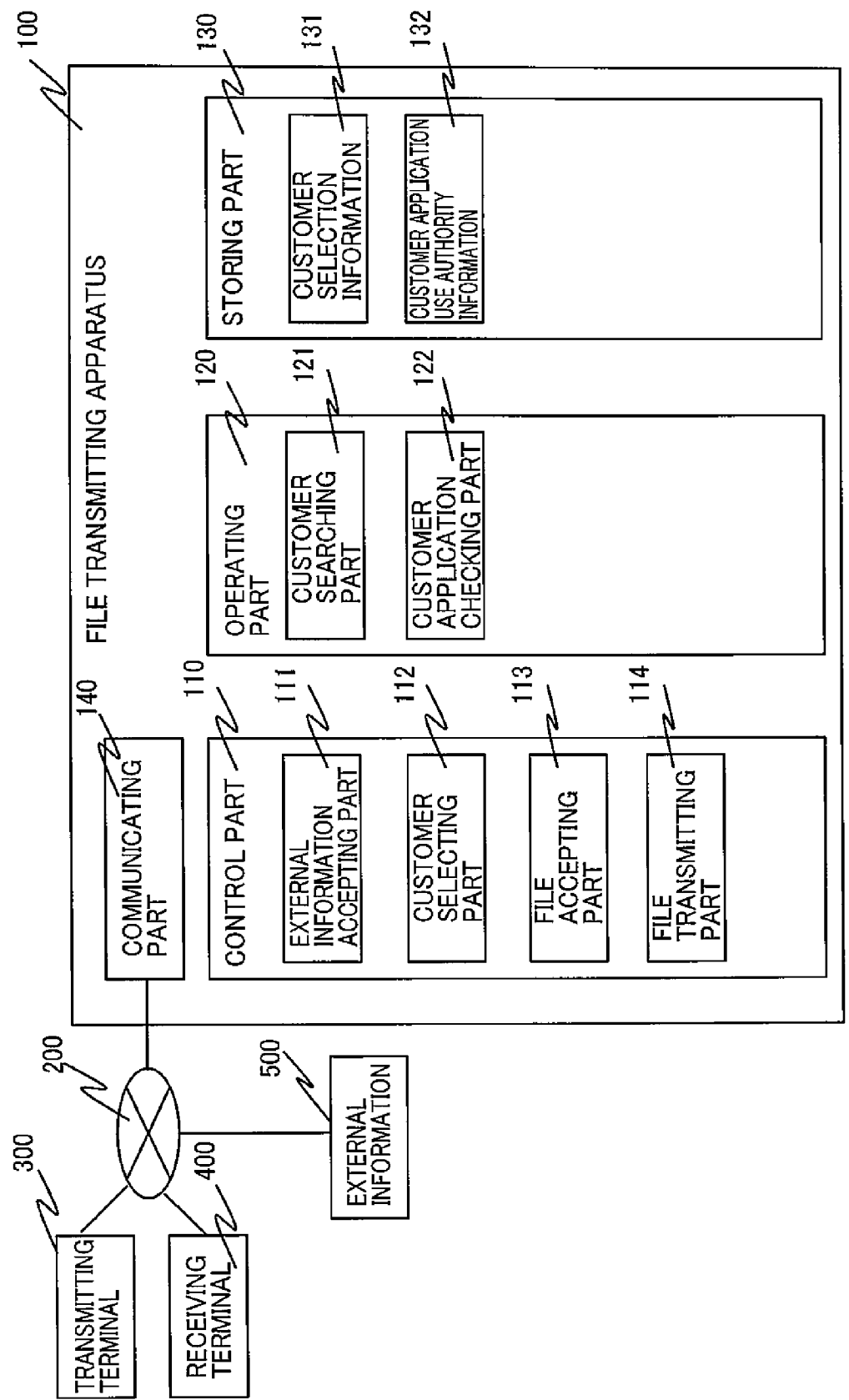
FIG. 1 shows an example of a configuration of a file transmitting apparatus of the present embodiment.
Figure 3:
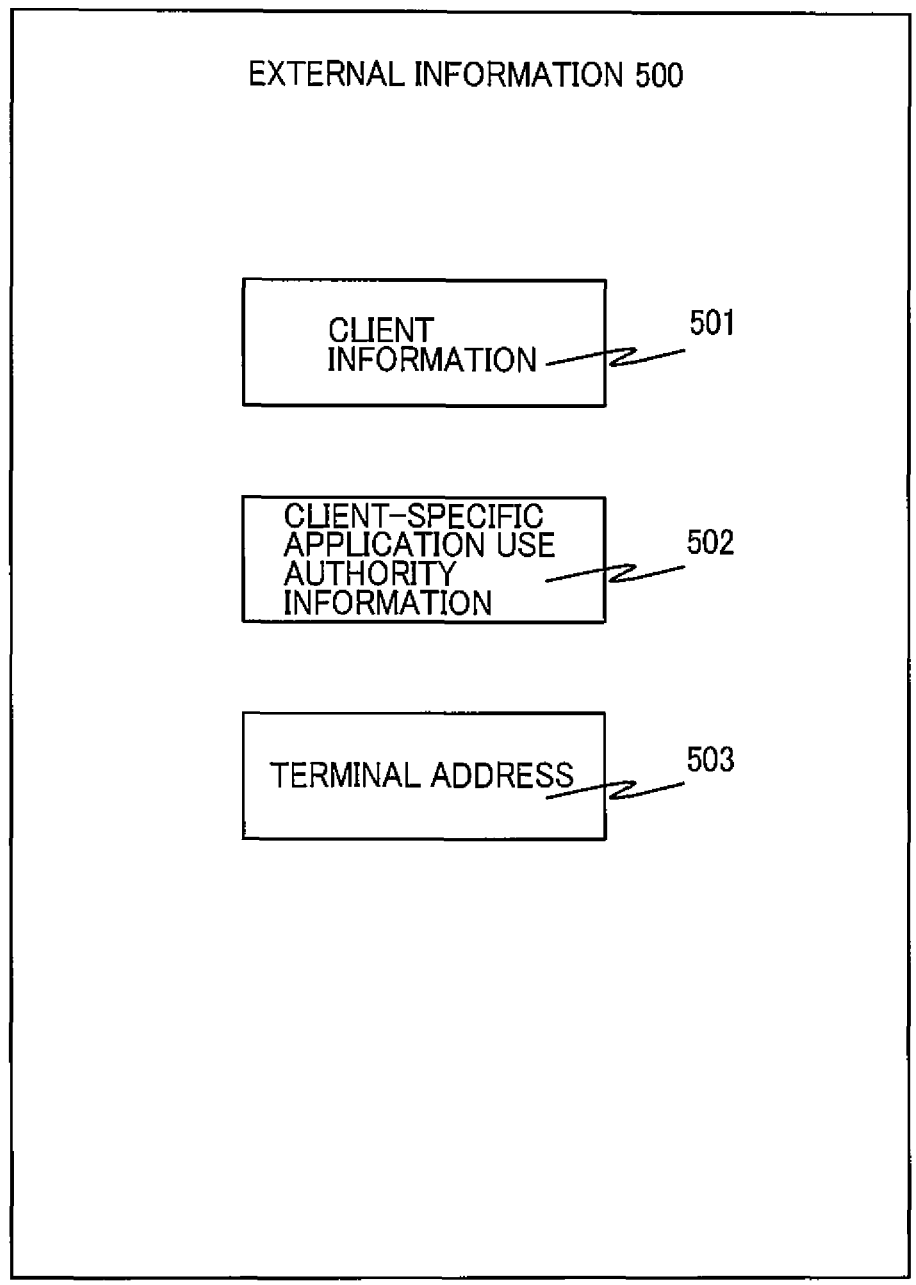
FIG. 3 shows an example of a data structure included in external information.

An embodiment of the present invention will be described in detail referring to the drawings hereinbelow. In the present embodiment, an exemplary file transmitting apparatus enabling presenting to a transmitter a file format available to a receiver as a client. FIG. 1 shows a configuration of a file transmitting apparatus 100 of the present embodiment. The file transmitting apparatus 100 of the present embodiment is, for example, a computer such as a personal computer (PC), a work station, and a server apparatus. The file transmitting apparatus 100 includes a controlling part 110, an operating part 120, a storing part 130, and a communicating part 140. The information required for processing at the operating part 120, the information not being preliminarily stored in the storing part 130, can be obtained from external information 500 such as in the form of a database server and a transmitting terminal 300 through a network 200 and a communicating part 140 as an interface.

The control part 110 is configured with an external information accepting part 111, a customer selecting part 112, a file accepting part 113, and a file transmitting part 114. The operating part 120 is configured with a customer searching part 121 and a customer application checking part 122. The storing part 130 stores customer selection information 131 and customer application use authority information 132. The network 200 can be usually assumed as a communication network such as a LAN (Local Area Network). However, the network 200 maybe a communication network partly including a public communication network such as the Internet, or a general public line such as a WAN (Wide Area Network) and VPN (Virtual Private Network).

Figure 11:
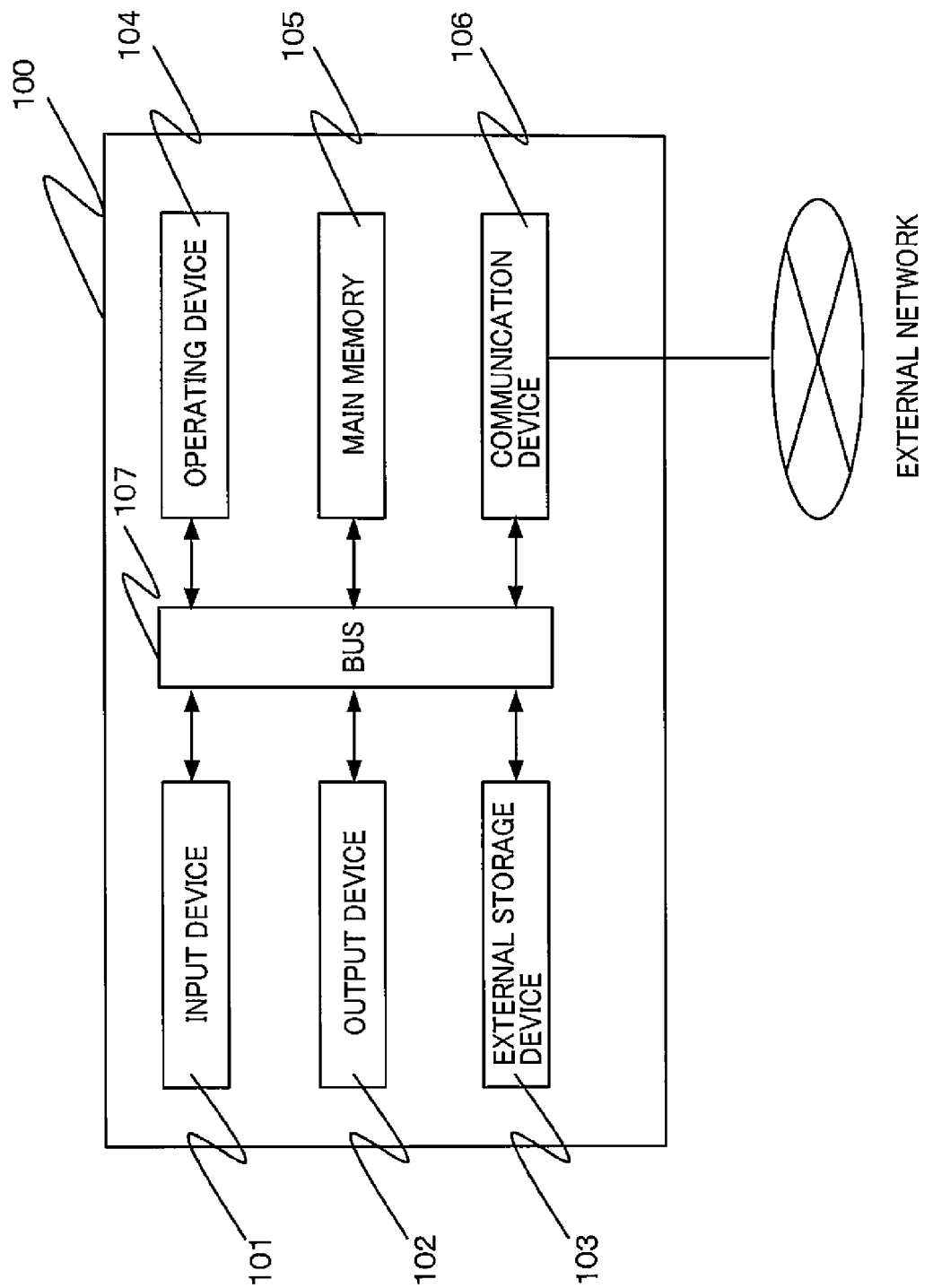
FIG. 11 shows an example of a hardware configuration of a file transmitting apparatus.

As shown in FIG. 11, the file transmitting apparatus 100 includes, as a hardware configuration, an input device 101, an output device 102, an external storage device 103, an operating device 104, a main memory 105, a communication device 106, and a bus 107 connecting the preceding devices with each other.

The input device 101 is a device for accepting an input such as a keyboard, a mouse, a tablet, and other pointing devices. The output device 102 is a device for displaying such as a display device. The external storage device 103 is a non-volatile memory device such as a hard disk device and a flash memory.

The operating device 104 is an operating device such as a CPU (Central Processing Unit), for example. The main memory 105 is a memory device such as a RAM (Random Access Memory), for example. The communication device 106 is a wireless communicating device performing a wireless communication via an antenna, or a wired communication device performing a wired communication via a network cable.

The storing part 130 of the file transmitting apparatus 100 is realized by the main memory 105 and/or the external storage device 103 in the hardware configuration as described above. Similarly, the file transmitting apparatus 100, the control part 110, and the operating part 120 are realized by executing a program which makes the operating device 104 in the hardware configuration as described above. The program is stored in the main memory 105 and/or the external storage device 103, is loaded into the main memory 105 upon being executed, and is executed by the operating device 104.

The program executed in the file transmitting apparatus 100 of the present embodiment may be provided in the form that the program is stored in a computer-readable recording medium such as a CD-ROM (Compact Disc Read Only Memory), a flexible disk, a CD-R (Compact Disc Recordable), and a DVD (Digital Versatile Disc) in an installable or an executable file format.

The program executed in the file transmitting apparatus 100 of the present embodiment may be configured such that the program is stored in a computer connected with a network such as the Internet and is provided by downloading of the same through the network. The program executed in the file transmitting apparatus 100 of the present embodiment may be provided or distributed through the network such as the Internet or provided in the form that the program is previously written into a ROM, or the like.

Figure 2:
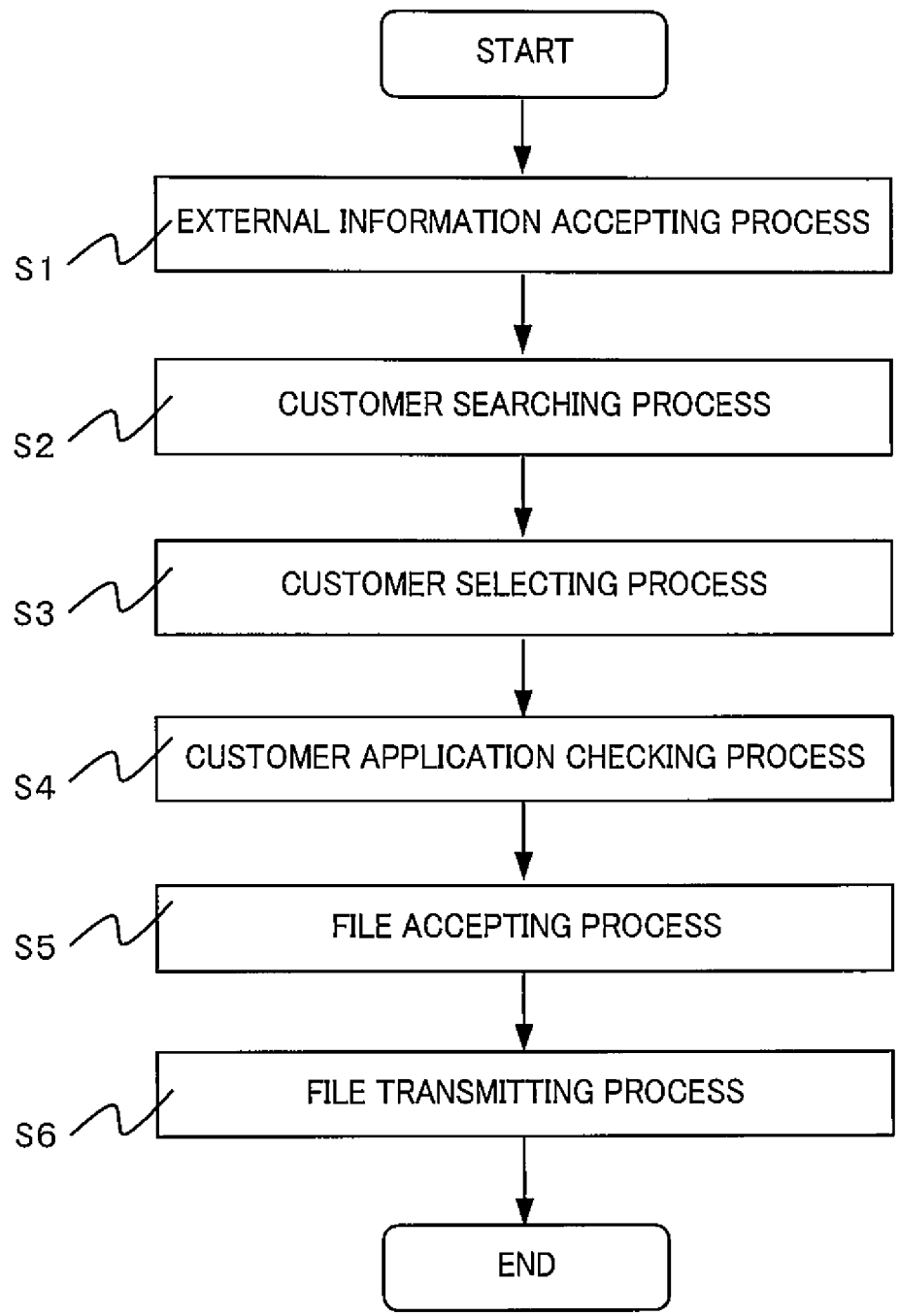
FIG. 2 shows an example of a process flow of a file transmitting method of the present embodiment.

FIG. 2 shows an example of a process flow of the control part 110 and the operating part 120 of the file transmitting apparatus 100. In this flow, first, the external information accepting part 111 of the file transmitting apparatus 100 carries out an external information accepting process (S1) of obtaining from the external information 500 held in the database server or the like client information 501, client-specific application use authority information 502, and a terminal address 503 and storing them in the storing part 130. The client information 501 held in the external information 500 is information for identifying each client. The client-specific application use authority information 502 is information of applications available to a corresponding client. The terminal address 503 is an address of a terminal (a transmitting terminal 300 or a receiving terminal 400) used by each client on the network 200. If the file transmitting apparatus 100 stores the above external information 500 in the storing part 130 in advance, the process (S1) is not necessary.

FIG. 4 shows an example of the configuration of the client information 501. The client information 501 stores a client code and a client name. The client code is a unique number for identifying each client. The client name is a name of the client identified by the corresponding client code. The record at the first row as illustrated indicates the name of the client whose client code is "CLIENT A" is "CLIENT NAME A."

FIG. 5 shows an example of a configuration of the client-specific application use authority information 502. The client-specific application use authority information 502 stores a client code, an application name, and a file format. The client code is a number for identifying each client. The application name is a name is applications available to the corresponding client. The file format is information of a file format which can be handled by the application of the client. The record at the first row indicates the client whose client code is "CLIENT A" can use the application whose application name is "APPLICATION X," and can handle the file whose file format is "DOC" with the application.

Though not shown specifically, the terminal address 503 is the data as a set of records, the client code and the address such as an email address and an IP address of the terminal of the corresponding client being correlated in each record. An example of the information stored in the external information 500 has been described above.

Then, the customer searching part 121 of the file transmitting apparatus 100 carries out the customer searching process (S2) of transferring the client information 501 stored in the storing part 130 to the customer selecting part 112. Next, the customer selecting part 112 of the file transmitting apparatus 100 carries out the customer selecting process (S3) of transmitting the client information 501 received from the customer searching part 121 to the transmitting terminal 300, accepting designation of the transmission target in the client information 501, i.e., designation of the customer selection information 131, and storing the designation in the storing part 130.

Figure 6:
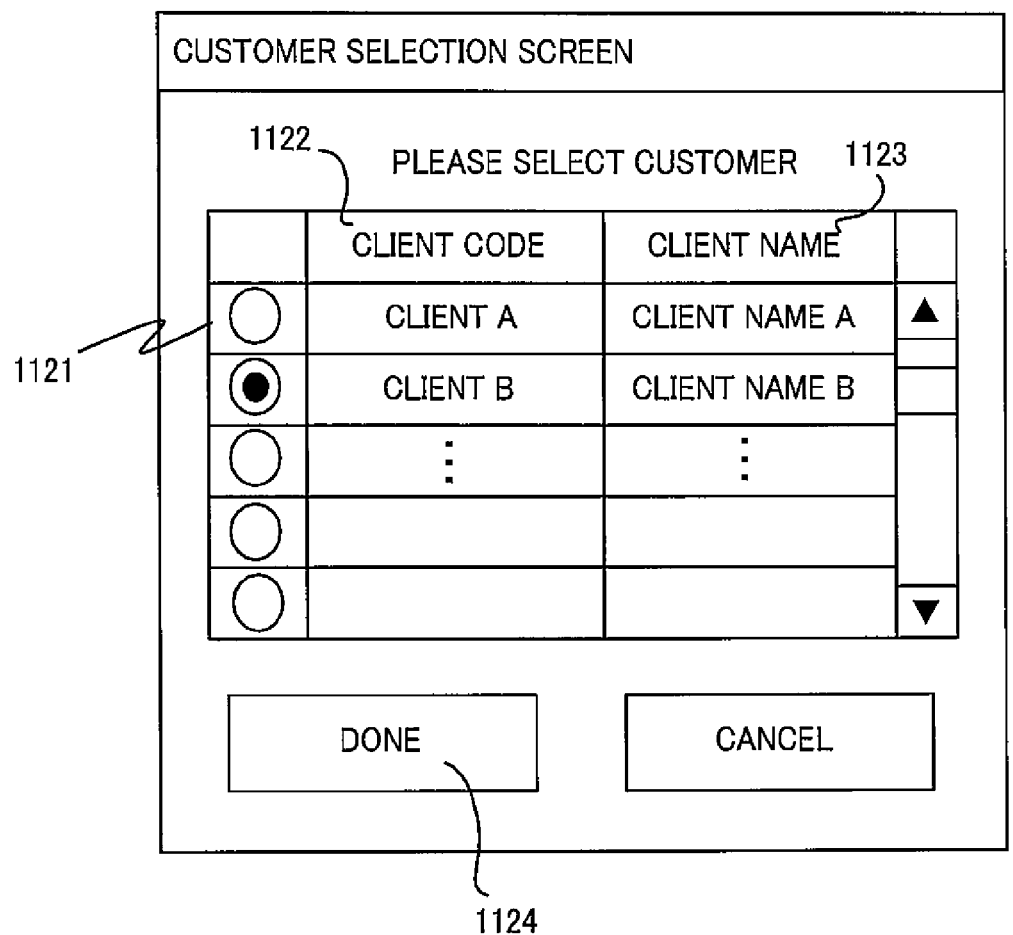
FIG. 6 shows an example of a customer selection screen of a customer selecting part.

FIG. 6 shows an example of a screen that, as a result of the customer searching process (S2), the customer selecting part 112 transmits to the transmitting terminal 300 and has the terminal 300 display. In the example of FIG. 6, a customer selection screen configured by the customer selecting part 112 has a customer selection radio button area 1121, a client code display area 1122, and a client name display area 1123. The client operating the transmitting terminal 300 is allowed to browse the customer selection screen on a display or the like, check the client information in the client code display area 1122, click the radio button corresponding to the client to be selected as a transmission target in the customer selection radio button area 1121, and operate the confirmation button 1124. Accordingly, the customer selecting part 112 accepts designation of the transmission target, or designation of the customer selection information 131 and stores the customer selection information 131 in the storing part 130.

FIG. 7 shows an example of the customer selection information 131. The customer selection information 131 of this example includes a client code and a client name. The client code is a unique number for identifying each client. The client name is a name of the client identified by the corresponding client code. This example indicates that the client name of "CLIENT NAME B" corresponding to the client code of "CLIENT B" is selected as a customer.

The above process can be considered as such a process that the customer selecting part 112 accepts the client information of the client as the transmission target from the transmitting terminal 300 used by the client who transmits a file, and identifies the client as the transmission target in the client information 501 of the storing part 130, using the client information as accepted as a search key.

Next, the customer application checking part 122 of the file transmitting apparatus 100 carries out a customer application checking process (S4) of creating customer application use authority information 132 from the customer selection information 131 stored in the storing part 130 and the client-specific application use authority information 502 regarding the client indicated by the customer selection information 131 in the storing part 130, and storing the information 132 in the storing part 130.

Figure 9:
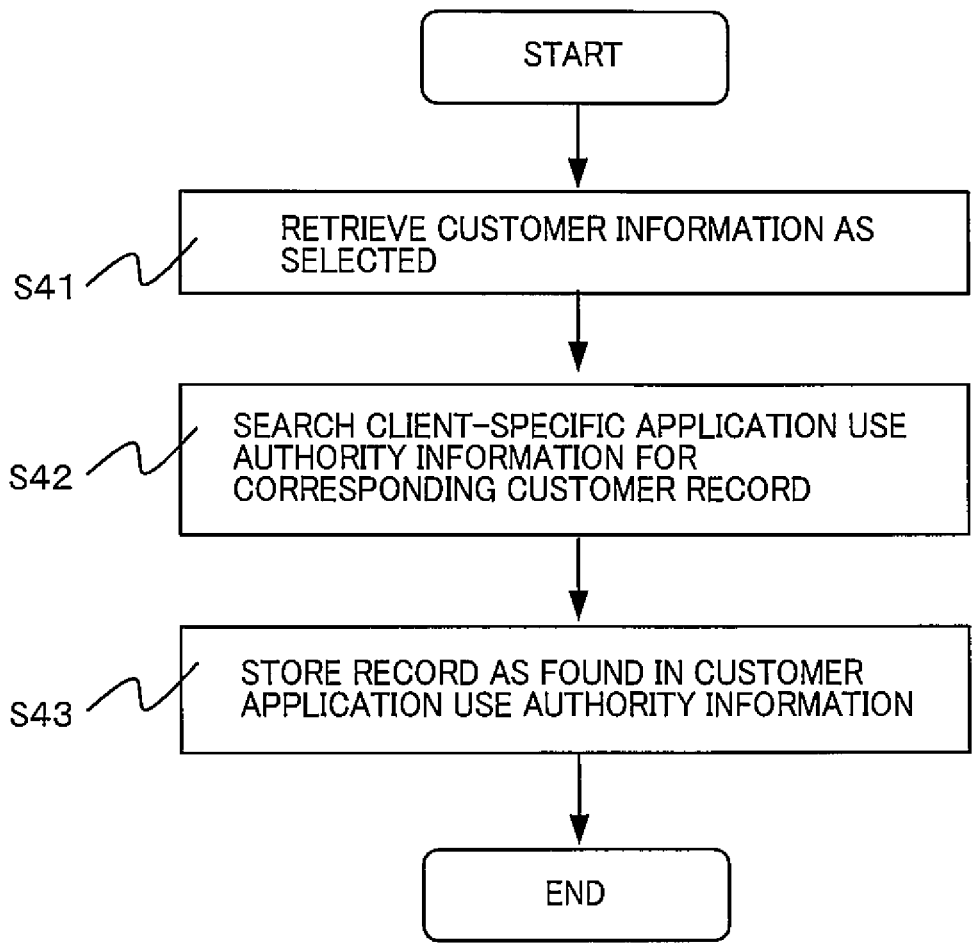
FIG. 9 shows an example of a flow of a customer application checking process.

Here, the above process will be described more particularly. As shown in FIG. 9, first, the customer application checking part 122 obtains the record stored in the customer selection information 131 (S41). Then, the customer application checking part 122 searches the record having the same client code regarding the customer record obtained at S41 in the client-specific application use authority information 502 of the external information 500 (S42). Finally, the customer application checking part 122 stores the record retrieved at S42 in the customer application use authority information 132 (S43).

FIG. 8 shows an example of the customer application use authority information 132 created through the customer application checking process (S4). The customer application use authority information 132 includes a client code, an application name, and a file format. The example indicates that the customer is selected, the customer being the client with the client code of "CLIENT B" who can handle the file of the file format of "DOC" by the application having the application name of "APPLICATION X."

Then, the file accepting part 113 of the file transmitting apparatus 100 carries out a file accepting process (S5) of transmitting to the transmitting terminal 300 the customer application use authority information 132 stored in the storing part 130 and information on the file to be transmitted accepted from the transmitting terminal 300.

Figure 10:
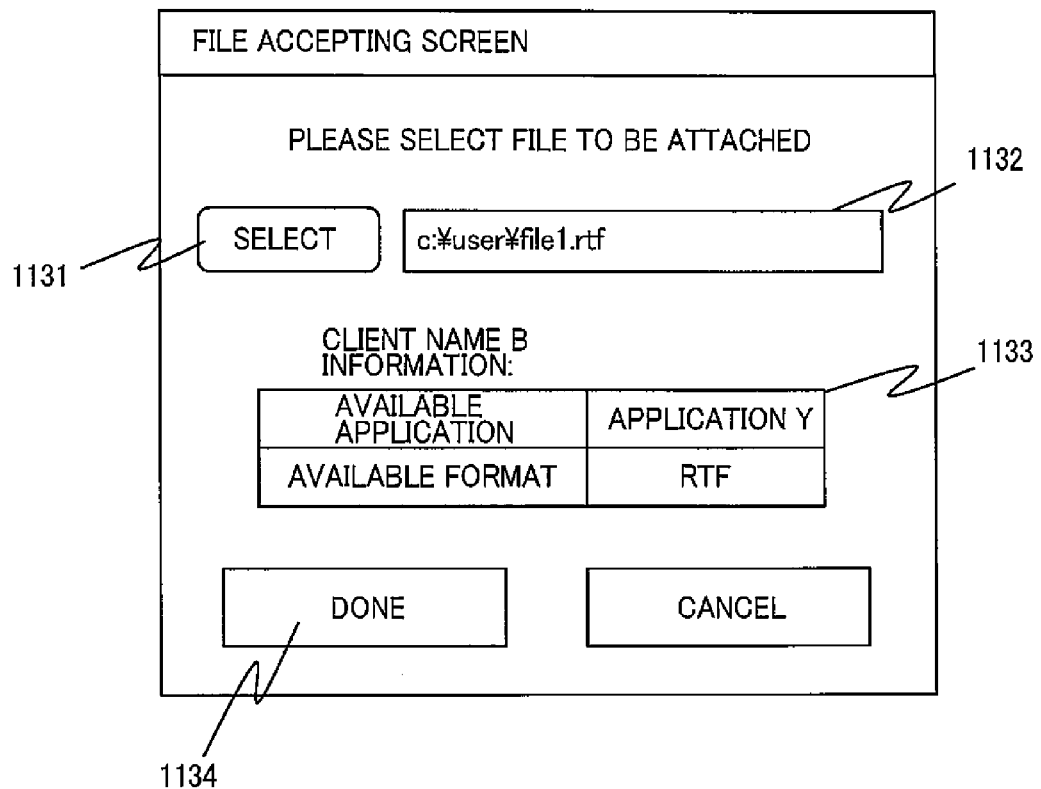
FIG. 10 shows an example of a file accepting screen of a file accepting part.

FIG. 10 shows an example of the file accepting screen presented to the transmitting terminal 300 by the file accepting part 113 at the file accepting process (S5). The file accepting screen includes a file selection button 1131, a file name display area 1132, and a customer information displaying part 1133. The file selection button 1131 is a button for selecting any file to be transmitted in those stored in the transmitting terminal 300. When the button 1131 is operated, a file managing application in the transmitting terminal 300 is activated to present the location of the target file to a user, for example, by displaying the folders and the files contained therein in a hierarchical manner. The file name display area 1132 is an area for displaying the file name of the files selected by a user through operation of the file selection button 1121 or the like. The customer information displaying part 1133 is an area for displaying information of the customer application use authority information 132 as obtained at the customer application checking process (S4).

Finally, the file transmitting part 114 of the file transmitting apparatus 100 carries out a file transmitting process (S6) of transmitting to the receiving terminal 400 the file to be transmitted accepted at S5 in response to the instruction for transmission from the transmitting terminal 300, for example. The above instruction can be considered as the instruction for checking whether or not any problem exists with the file format, such as the instruction for operating the confirmation button 1134 in the file accepting screen as shown in FIG. 10.

According to the present embodiment, it is possible to recognize the applications used at the receiving terminals that receive files and to present to the transmitting terminal beforehand whether or not the receiving terminal is able to use the file to be transmitted. Thus, the client at the transmitting side can transmit the file in the condition that the receiving side can use the file format of the file, and to reduce wasting labor such as retransmission of the file in a different format upon receipt of the notification from the receiving side.

If such entities as application service providers (ASP) provide a file transmission service employing the present embodiment, improvement of the ASP services provided to the existing users, increase in the clients, and the resulting increase in sales and profit will be realized.

Second Embodiment

Figure 12:
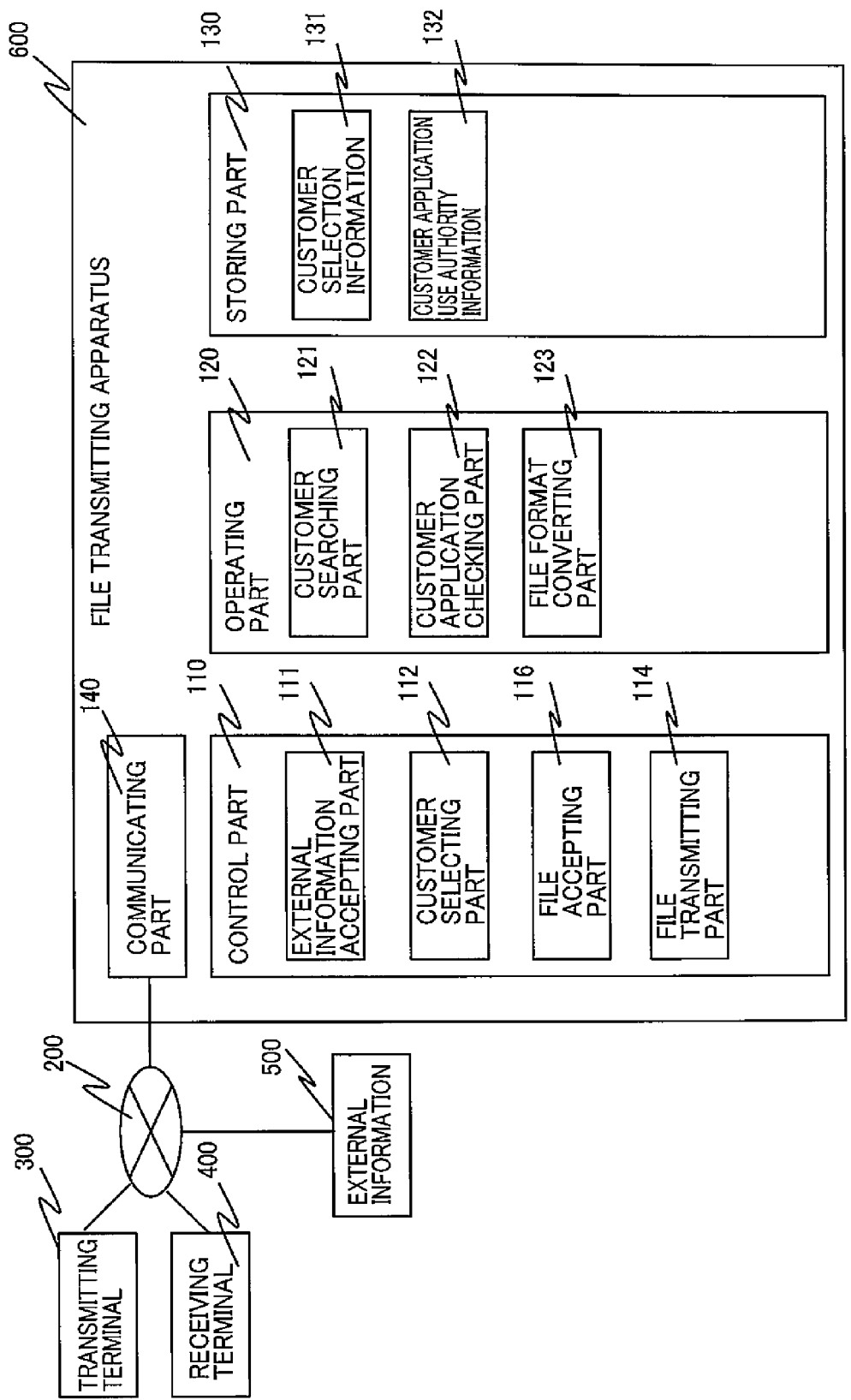
FIG. 12 shows another example of a configuration of a file transmitting apparatus.

In the present embodiment, an example of the file transmitting apparatus that converts the file format of the file to be transmitted into the file format which can be handled at the receiving side will be described. FIG. 12 shows a configuration of the file transmitting apparatus 600 according to the second embodiment. The file transmitting apparatus 600 exemplified herein corresponds to the file transmitting apparatus 100 as described above referring to FIG. 1 in which the file accepting part 113 of the control part 110 is renumbered as the file accepting part 116, and the file format converting part 123 is added to the operating part 120. The rest of the apparatus 600 are identical to those in the apparatus 100, thus the description of the identical pats is omitted. The file format converting part 123 has a function of format converting program for converting a file of a predetermined format into the one of a different format.

Figure 13:
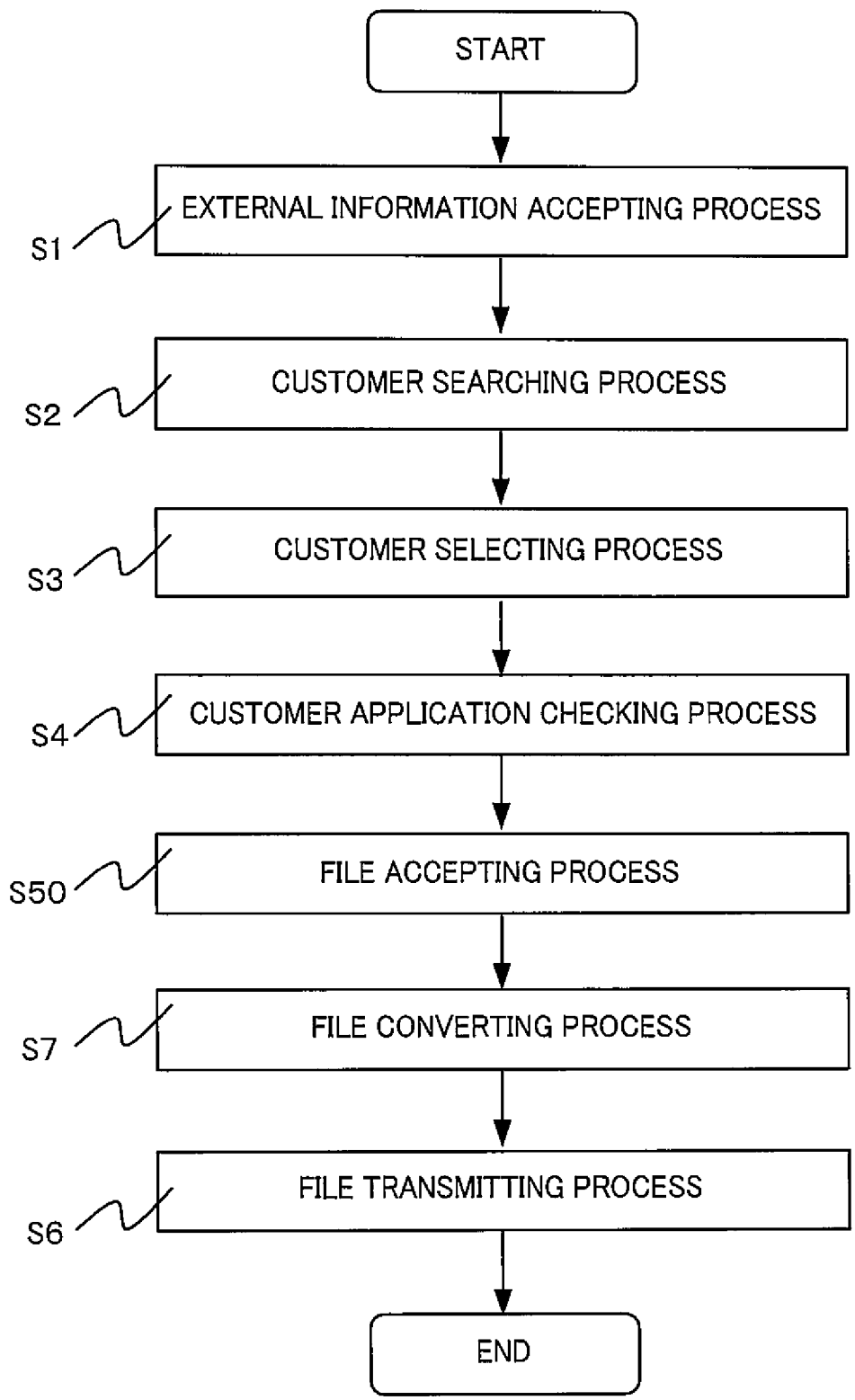
FIG. 13 shows another example of a process flow of a file transmitting apparatus.

The process flow in the present embodiment will be described hereinbelow. FIG. 13 shows an example of the process in the control part 110 and the operating part 120 in FIG. 12. The present process flow example corresponds to the example previously shown in FIG. 2 in which the step name of the file accepting process (S5) is changed to S50, and the file converting process (S7) is added. The rest of the present example is identical to those in the one shown in FIG. 2, and the description of the identical steps is omitted.

Here, the description begins with the step of S50. At S50, the file accepting part 116 of the file transmitting apparatus 600 carries out the file accepting process (S50) of transmitting the customer application use authority information 132 stored in the storing part 130 to the transmitting terminal 300, displaying the information 132 at the transmitting terminal 300, and accepting the file to be transmitted stored in the transmitting terminal 300.

Figure 14:
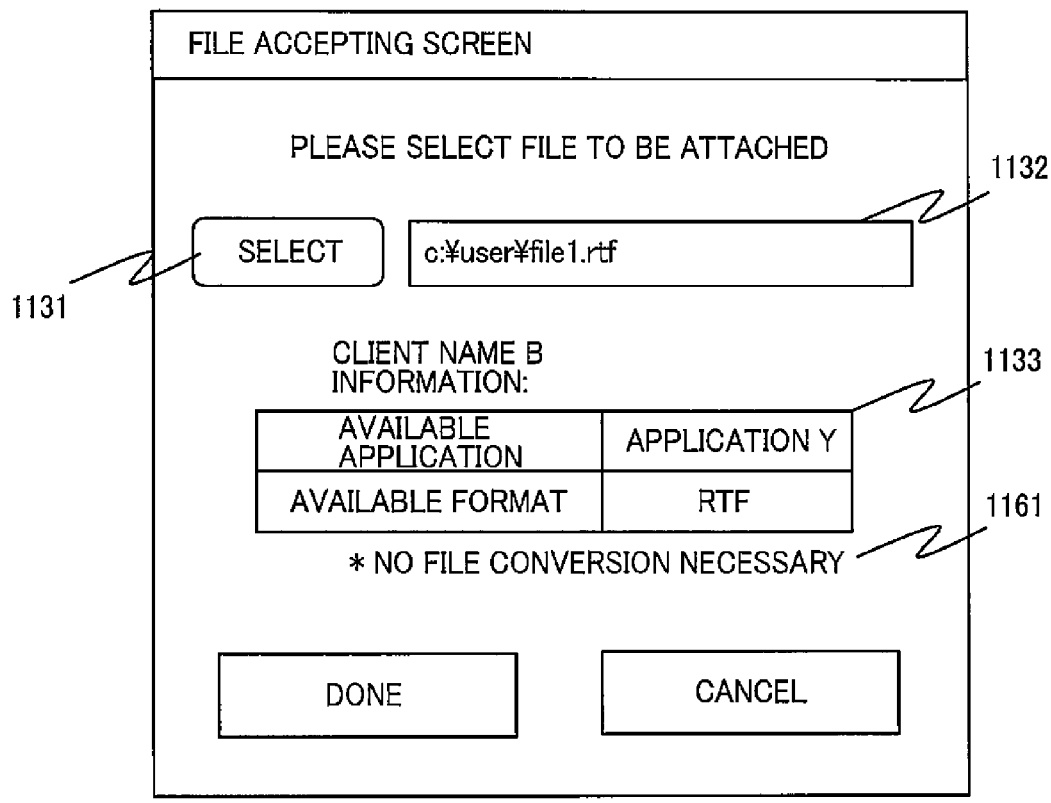
FIG. 14 shows another example of a file accepting screen of a file accepting part.

FIG. 14 shows an example of the file accepting screen configured by the file accepting part 116 at the file accepting process (S50). The file accepting screen is configured to include a file selection button 1131, a file name display area 1132, a customer information displaying part 1133, and a file conversion unnecessity description area 1161. The file format converting part 123 determines whether or not the format of the file to be transmitted corresponds to the file format indicated in the transmission target application use authority information 132. If determined as corresponding, the information indicating unnecessity of file conversion such as "No file conversion necessary." is included in the file conversion unnecessity description area 1161.

If determined as not corresponding, i.e., if it is determined the format of the file to be transmitted does not correspond to the file format indicated in the customer application use authority information 132 regarding the transmission target stored in the storing part 130, the file format converting part 123 of the file transmitting apparatus 600 carries out a file converting process (S7) of converting the file to be transmitted into the file with the format indicated in the transmission target application use authority information 132. The file format conversion may be realized by applying an existing file conversion technique.

Finally, the file transmitting part 114 of the file transmitting apparatus 600 carries out the file transmitting process (S6) of transmitting the file to be transmitted as converted at S7 to a terminal address of the client as a transmission target or the receiving terminal 400.

According to the present embodiment, it is enabled to recognize the application used at the receiving side and carry out automatic conversion of the file format in advance so that the file can be used at the receiving side. In this situation, the transmitting side can transmit the file without knowing if the file can be used at the receiving side or not.

Third Embodiment

Figure 15:
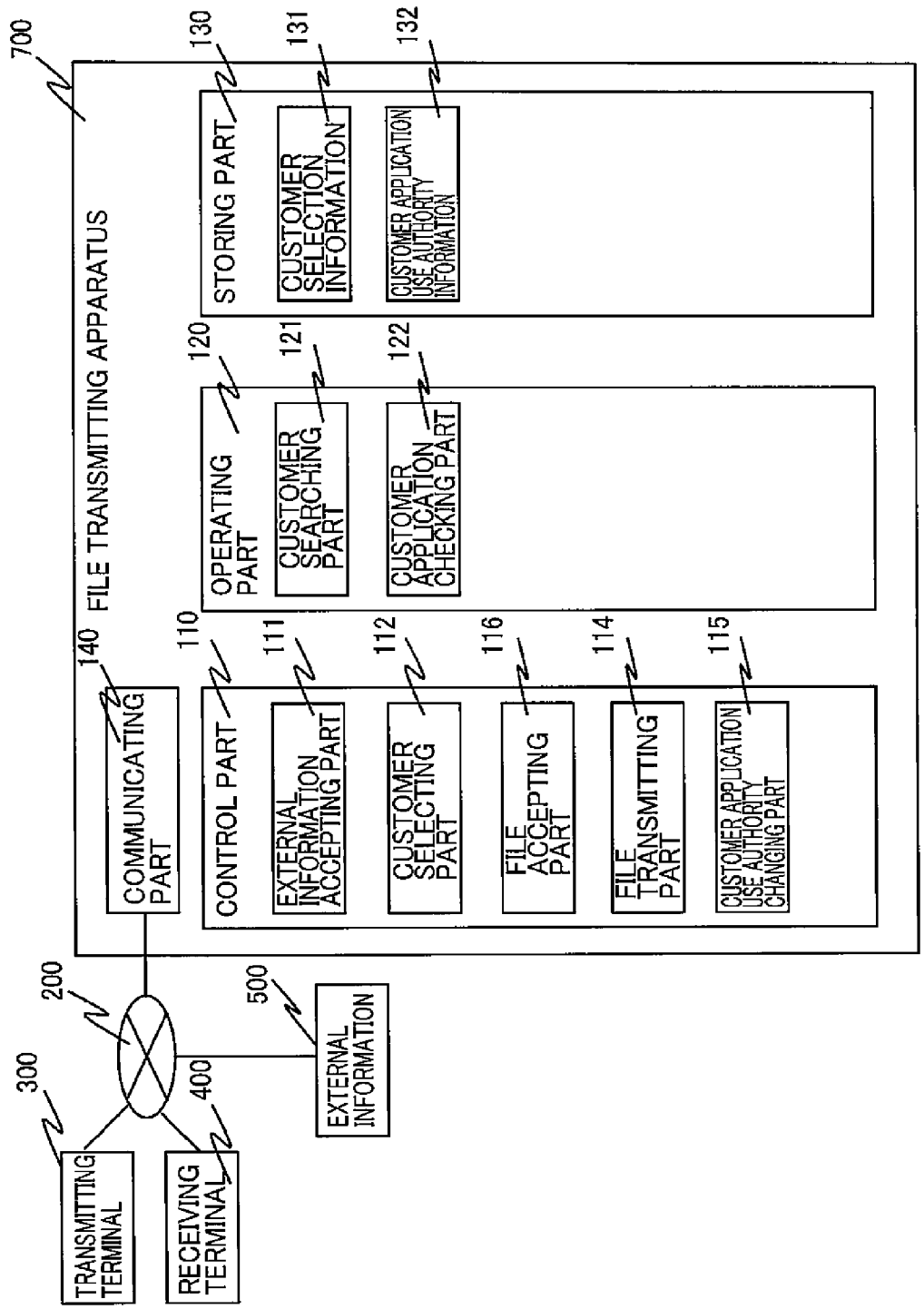
FIG. 15 shows yet another example of a configuration of a file transmitting apparatus.

In the present embodiment, an example of the file transmitting apparatus will be described, that is capable of changing an application use authority at the receiving side so that the receiving side can use the file format at the transmitting side. FIG. 15 shows an example of the configuration of the file transmitting apparatus 700 of the third embodiment. The file transmitting apparatus 700 of the third embodiment is the file transmitting apparatus 100 as previously shown in FIG. 1 in which the symbol of the file accepting part 113 of the control part 110 is changed to 116 and a customer application use authority changing part 115 is added. Since the rest of the configuration of the file transmitting apparatus 700 is identical, the description on the same is omitted here. The customer application use authority changing part 115 checks the format of the file to be transmitted as received from the transmitting terminal 300 against the customer application use authority information 132 concerning the client as a transmission target stored in the storing part 130. If it is determined the format of the file to e transmitted is different from the file format indicated by the customer application use authority information 132, the customer application use authority changing part 115 updates the client-specific application use authority information 502 concerning the client as a transmission target in the external information 500 by adding thereto a use authority for using the file to be transmitted and transmits the file to be transmitted to the terminal address of the client as at transmission target. The customer application use authority changing part 115 is a functional part realizing the above function.

Figure 16:
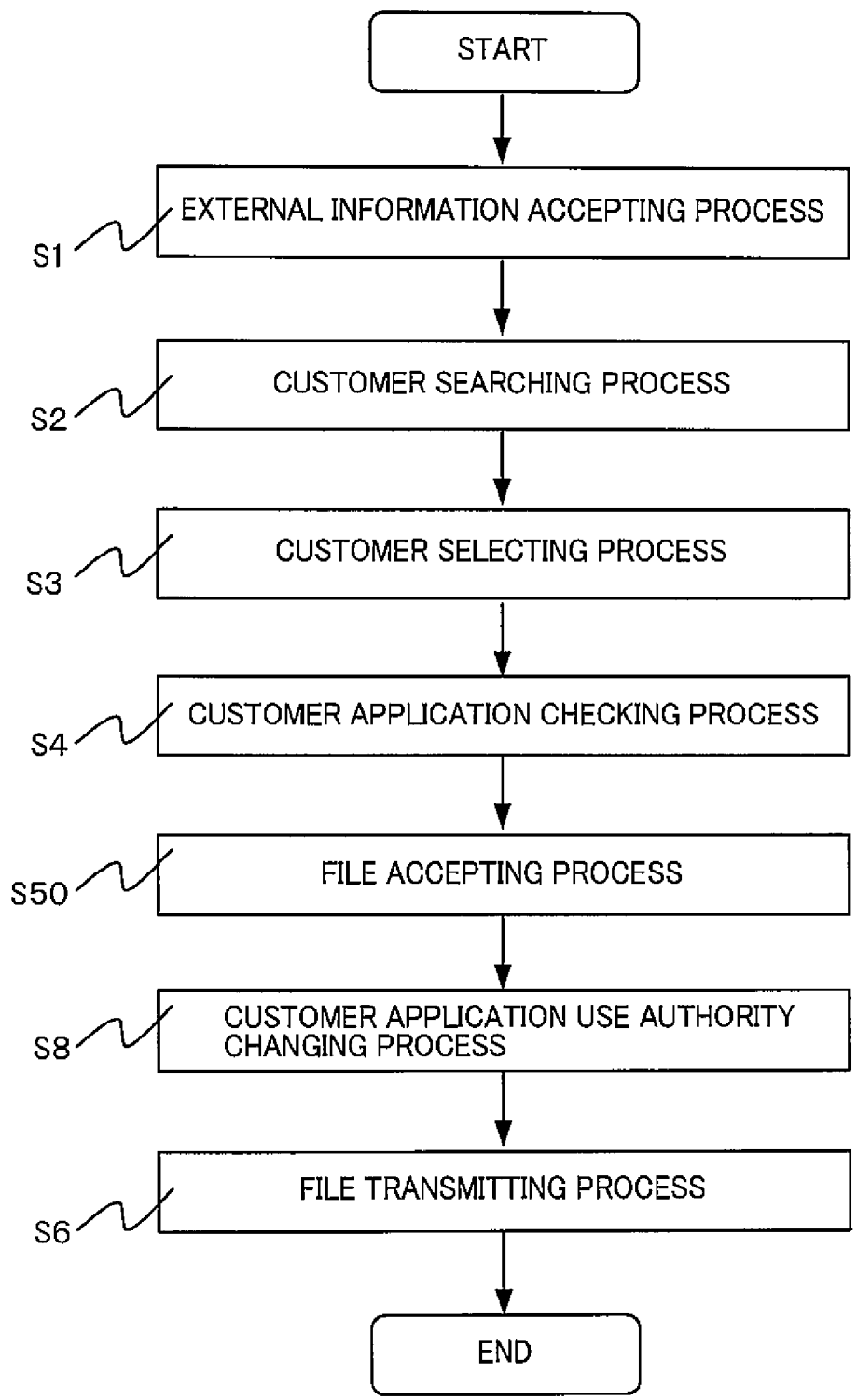
FIG. 16 shows yet another example of a process flow of a file transmitting apparatus.

FIG. 16 shows an example of the process flow in the control part 110 and the operating part 120 in FIG. 15. This process flow example corresponds to the process flow example in FIG. 2 in which the step name of the file accepting process (S5) is changed to S50 and a customer application use authority changing process (S8) is added. Since the rest of the configuration is identical to the one described above, the description on the same step is omitted here.

Here, the description will begin at S50. At S50, the file accepting part 116 of the file transmitting apparatus 700 carries out a file accepting process (S50) of transmitting the customer application use authority information 132 stored in the storing part 130 to the transmitting terminal 300, displaying the information 132 at the terminal 300, and accepting the file to be transmitted stored in the transmitting terminal 300. The detail of the file accepting process (S50) is as described above according to FIG. 14.

Next, the customer application use authority changing part 115 of the file transmitting apparatus 700 checks the format of the file accepted form the transmitting terminal 300 against the customer application use authority information 132 concerning the client as a transmission target stored in the storing part 130. If it is determined that the format of the file to be transmitted is different from the file format indicated in the customer application use authority information 132, the customer application use authority changing part 115 updates the client-specific application use authority information 502 by adding a use authority on the file to be transmitted concerning the client as a transmission target in the external information 500. More specifically, in the above updating process, the use authority flag for the application for handling the above file is changed to "AVAILABLE" in the client-specific application use authority information 502 concerning the client as a transmission target, for example. Accordingly, the customer application use authority changing part 115 carries out the customer application use authority changing process (S8) of changing the authority for the application so that the customer as a file transmission target can use the file.

Finally, the file transmitting part 114 of the file transmitting apparatus 700 carries out the file transmitting process (S6) of transmitting the file to be transmitted as accepted at S50 above to the terminal address of the client as a transmission target or the receiving terminal 400.

According to the present embodiment, the receiving side is enabled to acquire the use authority for the application for handling the above file and to receive and use the file as transmitted. Meanwhile, the transmitting side can perform file transmission without caring whether or not the receiving side can open the file to be transmitted.

Fourth Embodiment

Figure 17:
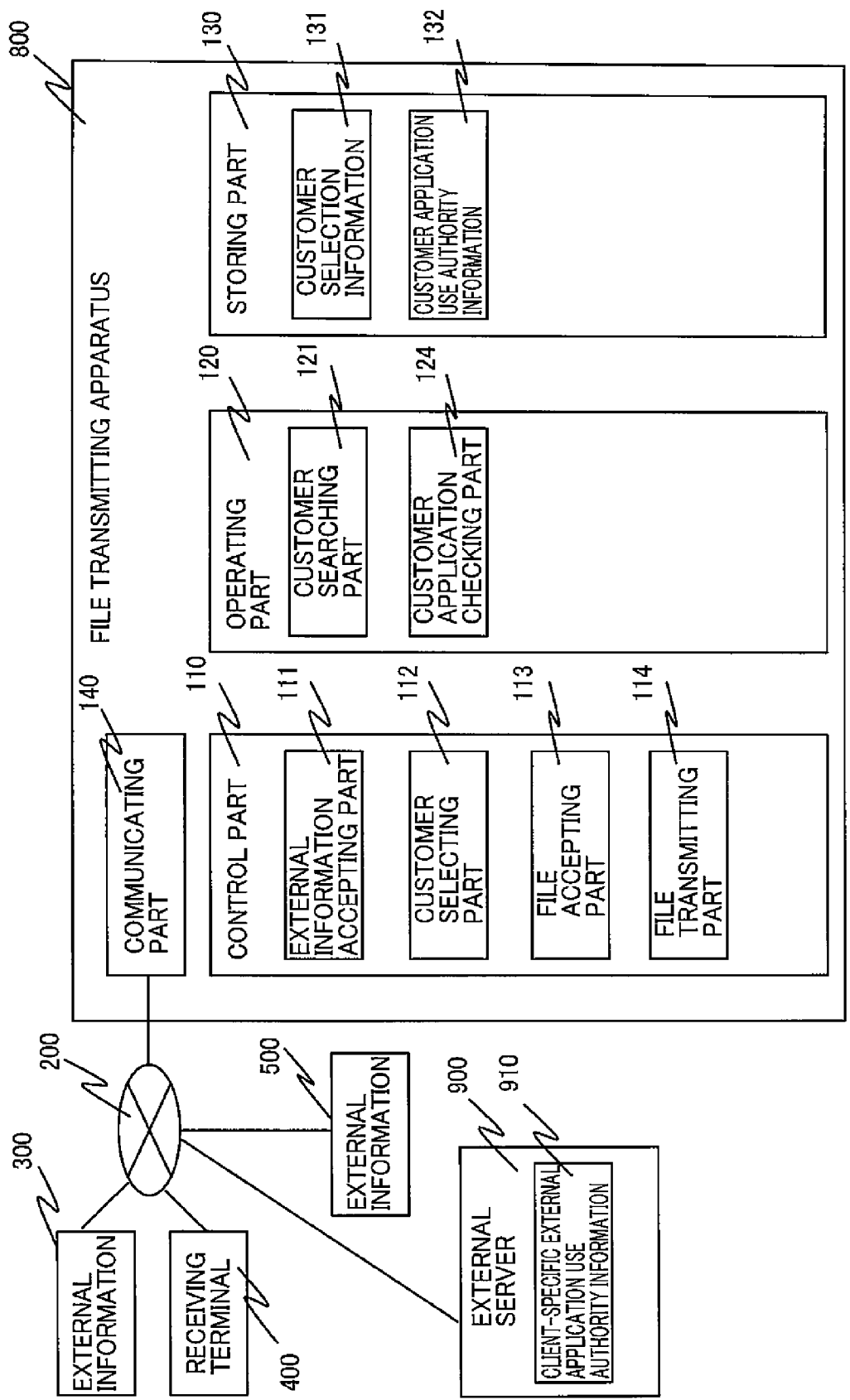
FIG. 17 shows further example of a configuration of a file transmitting apparatus.

In the present embodiment, an example of the file transmitting apparatus will be described that allow confirming the file format that the receiving side can use by checking the client-specific application use information in the external server 900. FIG. 17 shows an example of the configuration of a file transmitting apparatus 800 in the fourth embodiment. The file transmitting apparatus 800 corresponds to the file transmitting apparatus 100 in FIG. 1 in which the symbol of the customer application checking part 122 of the operating part 120 is changed to 124, and the external server 900 and client-specific external application use authority information 910 are added. The rest of the configuration is identical to those in the one shown in FIG. 1, and the description of the identical parts is omitted.

The file transmitting apparatus 800 is capable of acquiring the necessary information for the process in the operating part 120 from the external information 500, the transmitting terminal 300, and the external server 900 through the communicating part 140 as an interface and the network 200. The external server 900 stores at least client-specific external application use authority information 910.

Figure 18:
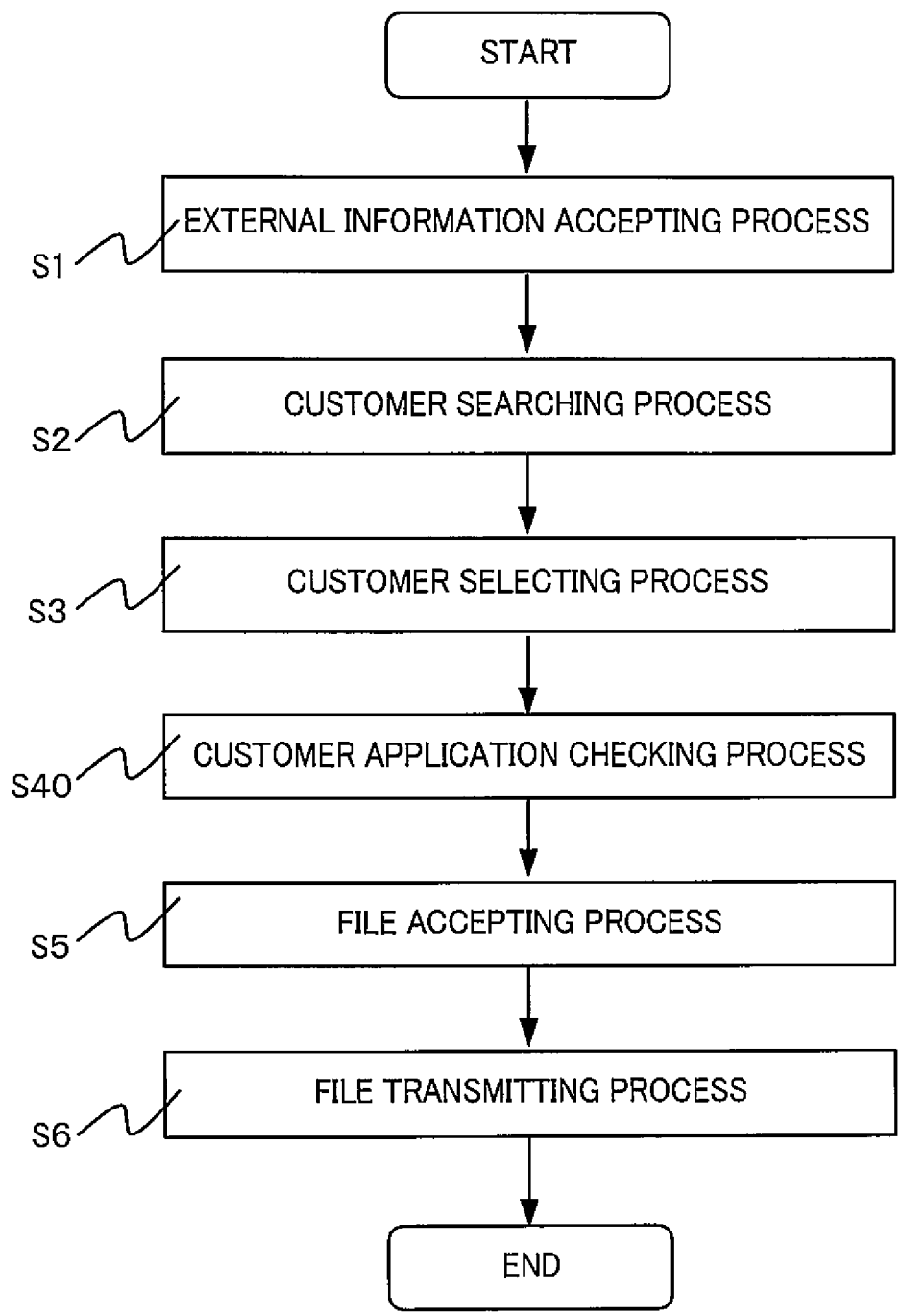
FIG. 18 shows further example of a process flow of a file transmitting apparatus.

FIG. 18 shows an example of a flow of a process in the control part 110 and the operating part 120 in FIG. 17. The present process flow example corresponds to the process flow example in FIG. 2 in which the name of the customer application checking process (S4) is changed to S40. Since the other steps in the process are identical to those having the same symbols in FIG. 2 as previously described, the description on the other steps will be omitted.

Here, the description will begin with the step of S40. At S40, the customer application checking part 124 of the file transmitting apparatus 700 carries out a customer application checking process (S40) of generating customer application use authority information 132 from the customer selection information 131 and the client-specific application use authority information 502 stored in the storing part 130, and the client-specific external application use authority information 910 acquired from the external server 900, and storing the client-specific external application use authority information 910 as generated in the storing part 130.

Figure 19:
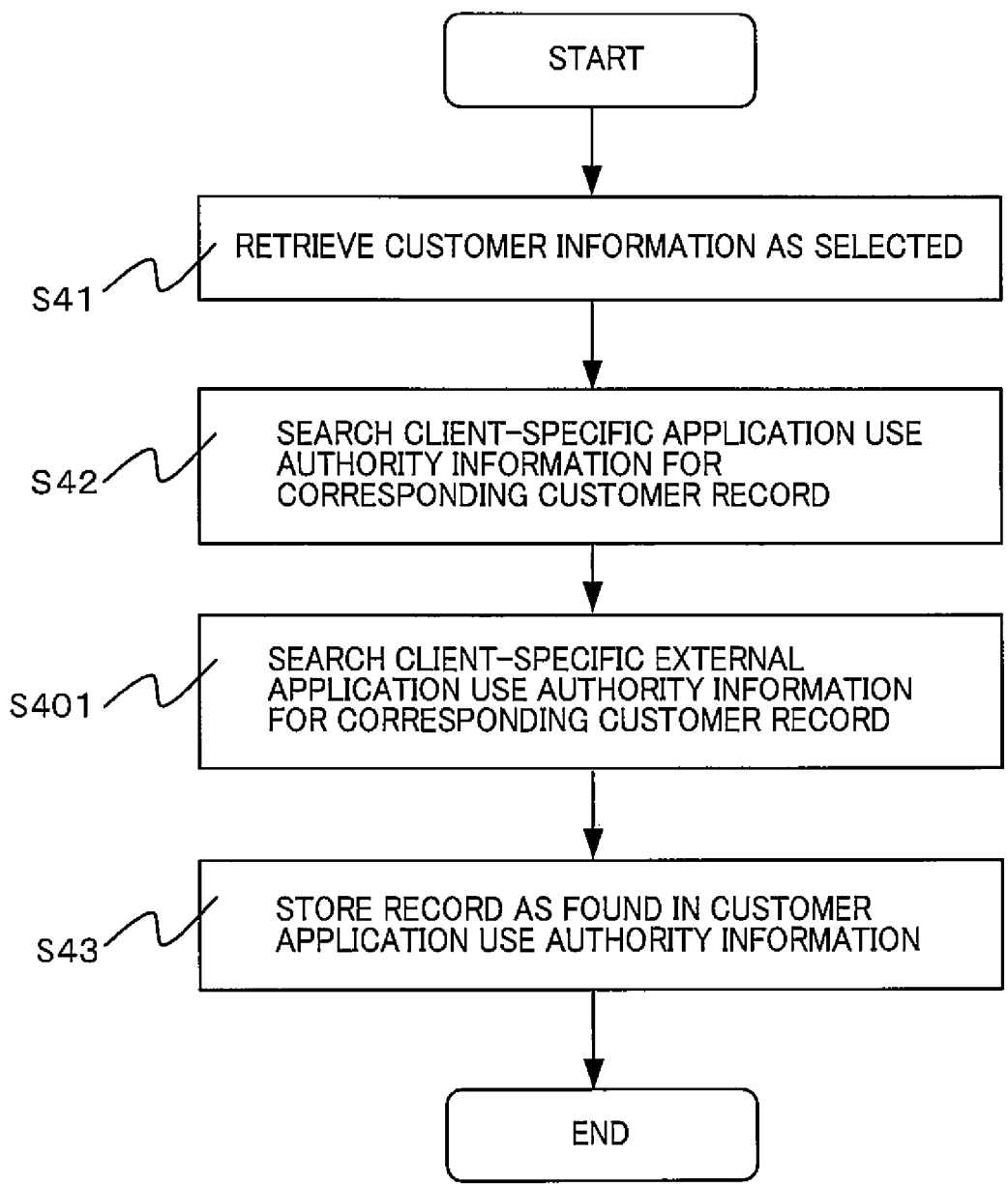
FIG. 19 shows another example of a flow of a customer application checking process.

The customer application use checking process S40 is indicated, more specifically, as the process flow in FIG. 19, for example. Here, the customer application checking part 124 acquires a record stored in the customer selection information 131 (S41). The customer application checking part 124 also search for a record having the client code identical to that in the record acquired at S41 in the client-specific application use authority information 502 in the external information 500 (S42).

Subsequently, the customer application checking part 124 transmits to the external server 900, a request for acquiring the client-specific application use authority information 910 included in the record of the identical client code, using the client code in the record acquired at S41, i.e., the client information as a key (S401). At this instance, if the client identified by the above client code, that is, the client as a transmission target is included in the clients managed in the external server, the customer application checking part 124 receives from the external server 900 the client-specific application use authority information 910 of the client as a transmission target, and stores the client-specific application use authority information 910 as received in the customer application use authority information 132 (S43).

FIG. 20 shows an example of a configuration of the client-specific external application use authority information 910. The client-specific external application use authority information 910 includes a client code, an application name, and a file format. The client code is a unique number for identifying a client. The application name is a name of an application that the corresponding client can use. The file format is a file format that the corresponding client can handle with the application. The record at the first row exemplified in FIG. 20 indicates the client with the client code of "CLIENT A" can use an application with the application name of "APPLICATION X" and can handle the file with the file format of "DOC."

Subsequently, the file accepting part 113 of the file transmitting apparatus 800 carries out the file accepting process (S5) of transmitting information of the customer application use authority information 132 stored in the storing part 130 to the transmitting terminal 300, displaying the information of the customer application use authority information 132 at the transmitting terminal 300, and accepting the file to be transmitted stored in the transmitting terminal 300.

Finally, the file transmitting part 114 of the file transmitting apparatus 800 carries out the file transmitting process (S6) of transmitting the file as accepted at the step, S5 to a terminal address of the client as a transmission target or the receiving terminal 400.

According to the present embodiment, in the cases that the client as a file transmission target is not the client managed in the file transmitting apparatus, or, though the client as a file transmission target is the client managed in the file transmitting apparatus, the client does not have authority for handling the format of the file to be transmitted, considering the possibility that the client is managed as the one by an external server 900 operated by another operator is considered, for example. Then, it is possible to inquire of the external server 900 on authority of using the application by the receiving client and to provide the transmitting side in advance with availability of the corresponding file format at the receiving side.

Note that the present invention should not be limitative to the above embodiments as they are, but the present invention may be implemented at a stage of reduction through modification of the constituent elements without departing from the scope and the spirit of the present invention. An appropriate combination of the plurality of the constituent elements disclosed in the embodiment may create a variety of inventions. For example, some constituent elements may be omitted from those in the above embodiment. The constituent elements across the different embodiments may be combined in an appropriate manner.

Though the present invention has been described specifically using the modes for carrying out the invention and the like, the present invention should not be taken limitative to the modes/embodiments. The present invention may be modified and/or altered in various ways without departing the scope and the spirit thereof.

According to the embodiments of the present invention, when a file is transmitted from a file creating party, i.e., a transmitter to a transmission target, i.e., a receiver, such actions are automatically carried out as determining the application available at the receiver, presenting the file format that the application at the receiver can use, conversion of the file format into that can be used at the receiver, and providing use authority to the receiver. Therefore, the transmitting party can avoid such an inconvenience as repeated transmission of the file.

Accordingly, it becomes possible to present to a file transmitting party information of a file format which is able to be operated and/or edited by a file receiving party and to support file transmission according to the corresponding file format.

The description in the present specification discloses at least the following configurations:

In the file transmitting apparatus, the storing device may store a format conversion program for converting a file of a predetermined format into a file of a different format, and the operating device may check a format of the file to be transmitted as accepted from the transmitting terminal against the client-specific application use authority information concerning the client as a transmission target stored in the storing device, and, if the format of the file to be transmitted is determined different from the format of the file indicated by the client-specific application use authority information, may call the format conversion program from the storing device, may convert the file to be transmitted into the file of the format indicated in the client-specific application use authority information, and may transmit the file as converted to the terminal address of the client as a transmission target.

In the file transmitting apparatus, the operating device may carry out checking a format of the file to be transmitted as accepted from the transmitting terminal against the client-specific application use authority information concerning the client as a transmission target stored in the storing device, if the format of the file to be transmitted is determined different from the format of the file indicated by the client-specific application use authority information updating the client-specific application use authority information concerning the client as a transmission target in the storing device by adding a use authority for the file to be transmitted, and transmitting the file to be transmitted to the terminal address of the client as a transmission target.

In the file transmitting apparatus, the operating device may carry out transmitting a request for acquiring the client-specific application use authority information concerning the client as a transmission target using client information of the client as a transmission target accepted from the transmitting terminal as a key to an external server on the network, if the client as a transmission target is included in clients managed by the external server, receiving from the external server the client-specific application use authority information of the client as a transmission target, and storing the client-specific application use authority information in the storing device, and accepting the file to be transmitted from the transmitting terminal, and transmitting information of the file to be transmitted with the client-specific application use authority information concerning the client as a transmission target from the external server stored in the storing device to an address of the transmitting terminal.

In the file transmitting method, the storing device of the information processing apparatus may store a format conversion program for converting a file of a predetermined format into a file of a different format, and the information processing apparatus may check a format of the file to be transmitted as accepted from the transmitting terminal against the client-specific application use authority information concerning the client as a transmission target stored in the storing device, and, if the format of the file to be transmitted is determined different from the format of the file indicated by the client-specific application use authority information, may call the format conversion program from the storing device, may convert the file to be transmitted into the file of the format indicated in the client-specific application use authority information, and may transmit the file as converted to the terminal address of the client as a transmission target.

In the file transmitting method, the information processing apparatus may carry out checking a format of the file to be transmitted as accepted from the transmitting terminal against the client-specific application use authority information concerning the client as a transmission target stored in the storing device, if the format of the file to be transmitted is determined different from the format of the file indicated by the client-specific application use authority information updating the client-specific application use authority information concerning the client as a transmission target in the storing device by adding a use authority for the file to be transmitted, and transmitting the file to be transmitted to the terminal address of the client as a transmission target.

In the file transmitting method, the information processing apparatus may carry out transmitting a request for acquiring the client-specific application use authority information concerning the client as a transmission target using client information of the client as a transmission target accepted from the transmitting terminal as a key to an external server on the network, if the client as a transmission target is included in clients managed by the external server, receiving from the external server the client-specific application use authority information of the client as a transmission target, and storing the client-specific application use authority information in the storing device, and accepting the file to be transmitted from the transmitting terminal, and transmitting information of the file to be transmitted with the client-specific application use authority information concerning the client as a transmission target from the external server stored in the storing device to an address of the transmitting terminal.

What is claimed is:

1. A file transmitting apparatus as an information processing apparatus connected to a plurality of terminals of clients for transmitting and receiving a file through a network, the file transmitting apparatus comprising:
a communicating device configured to communicate with the terminals through the network;
a storing device configured to store, for each client, client information for identifying the client, client-specific application use authority information as information of an application available to the client, and a terminal address; and
an operating device configured to execute the following:
accepting client information of a client as a transmission target from a transmitting terminal used by a client who is to transmit a file, identifying the client-specific application use authority information of the client as the transmission target in the storing device using the client information as accepted as a key, and storing the client-specific application use authority information as identified,
accepting the file to be transmitted from the transmitting terminal, and transmitting information of the file to be transmitted with the client-specific application use authority information concerning the client as a transmission target stored in the storing device to an address of the terminal as a transmission target,
checking a format of the file to be transmitted, as accepted from the transmitting terminal, against the client-specific application use authority information concerning the client as a transmission target stored in the storing device,
adding a use authority for the file to be transmitted, in order to update the client-specific application use authority information concerning the client as a transmission target in the storing device, when the format of the file to be transmitted is determined to be different from the format of the file indicated by the client-specific application use authority information, and
transmitting the file to be transmitted to the terminal address of the client as a transmission target.

2. The file transmitting apparatus of claim 1,
wherein the storing device stores a format conversion program configured to convert a file of a predetermined format into a file of a different format; and
wherein the operating device is configured to perform the following steps as an alternative to adding a use authority for the file to be transmitted:
call the format conversion program from the storing device, converts the file to be transmitted into the file of the format indicated in the client-specific application use authority information, when the format of the file to be transmitted is determined to be different from the format of the file indicated by the client-specific application use authority information; and
transmit the file as converted to the terminal address of the client as a transmission target.

3. The file transmitting apparatus of claim 2, wherein the operating device is configured to execute the following steps:
transmitting a request for acquiring the client-specific application use authority information concerning the client as a transmission target, by using client information of the client as a transmission target accepted from the transmitting terminal as a key to an external server on the network,
receiving from the external server the client-specific application use authority information of the client as a transmission target, and storing the client-specific application use authority information in the storing device, when the client is included in a list of clients managed by the external server, as a transmission target; and
accepting the file to be transmitted from the transmitting terminal, and transmitting information of the file to be transmitted with the client-specific application use authority information concerning the client as a transmission target from the external server stored in the storing device to an address of the transmitting terminal.

4. The file transmitting apparatus of claim 1, wherein the operating device: is configured to execute the following steps:
transmitting a request for acquiring the client-specific application use authority information concerning the client as a transmission target, by using client information of the client as a transmission target accepted from the transmitting terminal as a key to an external server on the network, and
receiving from the external server the client-specific application use authority information of the client as a transmission target, and storing the client-specific application use authority information in the storing device, when the client is included in a list of clients managed by the external server, as a transmission target; and
accepting the file to be transmitted from the transmitting terminal, and transmitting information of the file to be transmitted with the client-specific application use authority information concerning the client as a transmission target from the external server stored in the storing device to an address of the transmitting terminal.

5. A file transmitting method carried out in an information processing apparatus connected to a plurality of terminals of clients for transmitting and receiving a file through a network, the information processing apparatus including
a communicating device configured to communicate with the terminals through the network; and
a storing device configured to store, for each client, client information for identifying the client, client-specific application use authority information as information of an application available to the client, and a terminal address, the file transmitting method comprising:
accepting client information of a client as a transmission target from a transmitting terminal used by a client who is to transmit a file, identifying the client-specific application use authority information of the client as the transmission target in the storing device using the client information as accepted as a key, and storing the client-specific application use authority information as identified, by the information processing apparatus,
accepting the file to be transmitted from the transmitting terminal, and transmitting information of the file to be transmitted with the client-specific application use authority information concerning the client as a transmission target stored in the storing device to an address of the terminal as a transmission target, by the information processing apparatus, and
checking a format of the file to be transmitted, as accepted from the transmitting terminal, against the client-specific application use authority information concerning the client as a transmission target stored in the storing device,
adding a use authority for the file to be transmitted, in order to update the client-specific application use authority information concerning the client as a transmission target in the storing device, when the format of the file to be transmitted is determined to be different from the format of the file indicated by the client-specific application use authority information, and
transmitting the file to be transmitted to the terminal address of the client as a transmission target.

6. The file transmitting method of claim 5,
wherein the storing device stores a format conversion program is configured to convert a file of a predetermined format into a file of a different format; and
wherein the information processing apparatus is configured to perform the following steps as an alternative to adding a use authority for the file to be transmitted:
call the format conversion program from the storing device, converts the file to be transmitted into the file of the format indicated in the client-specific application use authority information, when the format of the file to be transmitted is determined to be different from the format of the file indicated by the client-specific application use authority information, and
transmit the file as converted to the terminal address of the client as a transmission target.

7. The file transmitting method of claim 6, wherein the information processing apparatus is configured to execute the following steps:
transmitting a request for acquiring the client-specific application use authority information concerning the client as a transmission target, by using client information of the client as a transmission target accepted from the transmitting terminal as a key to an external server on the network,
receiving from the external server the client-specific application use authority information of the client as a transmission target, and storing the client-specific application use authority information in the storing device, when the client is included in a list of clients managed by the external server, as a transmission target; and
accepting the file to be transmitted from the transmitting terminal, and transmitting information of the file to be transmitted with the client-specific application use authority information concerning the client as a transmission target from the external server stored in the storing device to an address of the transmitting terminal.

8. The file transmitting method of claim 5, wherein the information processing apparatus is configured to execute the following steps:
transmitting a request for acquiring the client-specific application use authority information concerning the client as a transmission target, by using client information of the client as a transmission target accepted from the transmitting terminal as a key to an external server on the network,
receiving from the external server the client-specific application use authority information of the client as a transmission target, and storing the client-specific application use authority information in the storing device, when the client is included in a list of clients managed by the external server, as a transmission target, and
accepting the file to be transmitted from the transmitting terminal, and transmitting information of the file to be transmitted with the client-specific application use authority information concerning the client as a transmission target from the external server stored in the storing device to an address of the transmitting terminal.

9. A file transmitting program, stored in a non-transient computer-readable recording medium, that when executed by an information processing apparatus connected to a plurality of terminals of clients is configured to transmit and receive a file through a network, the information processing apparatus including
a communicating device configured to communicate with the terminals through the network, and
a storing device configured to store, for each client, client identification information, client-specific application use authority information as information of an application available to the client, and a terminal address,
the file transmitting program causing an information processing apparatus to execute the following steps:
accepting client information of a client as a transmission target from a transmitting terminal used by a client who is to transmit a file, identifying the client-specific application use authority information of the client as the transmission target in the storing device using the client information as accepted as a key, and storing the client-specific application use authority information as identified,
accepting the file to be transmitted from the transmitting terminal, and transmitting information of the file to be transmitted with the client-specific application use authority information concerning the client as a transmission target stored in the storing device to an address of the terminal as a transmission target, and
checking a format of the file to be transmitted, as accepted from the transmitting terminal, against the client-specific application use authority information concerning the client as a transmission target stored in the storing device, adding a use authority for the file to be transmitted, in order to update the client-specific application use authority information concerning the client as a transmission target in the storing device, when the format of the file to be transmitted is determined to be different from the format of the file indicated by the client-specific application use authority information, and transmitting the file to be transmitted to the terminal address of the client as a transmission target.

10. A non-transient computer-readable recording medium containing a file transmitting program, that when executed by an information processing apparatus connected to a plurality of terminals of clients configured to transmit and receive a file through a network, the information processing apparatus including a communicating device configured to communicate with the terminals through the network, and a storing device configured to store, for each client, client identification information, client-specific application use authority information as information of an application available to the client, and a terminal address, the file transmitting program causing the information processing apparatus to execute the following steps:

accepting client information of a client as a transmission target from a transmitting terminal used by a client who is to transmit a file, identifying the client-specific application use authority information of the client as the transmission target in the storing device using the client information as accepted as a key, and storing the client-specific application use authority information as identified, accepting the file to be transmitted from the transmitting terminal, and transmitting information of the file to be transmitted with the client-specific application use authority information concerning the client as a transmission target stored in the storing device to an address of the terminal as a transmission target, and checking a format of the file to be transmitted, as accepted from the transmitting terminal, against the client-specific application use authority information concerning the client as a transmission target stored in the storing device, adding a use authority for the file to be transmitted, in order to update the client-specific application use authority information concerning the client as a transmission target in the storing device, when the format of the file to be transmitted is determined to be different from the format of the file indicated by the client-specific application use authority information, and transmitting the file to be transmitted to the terminal address of the client as a transmission target.

* * * * *